Patented Oct. 7, 1924.

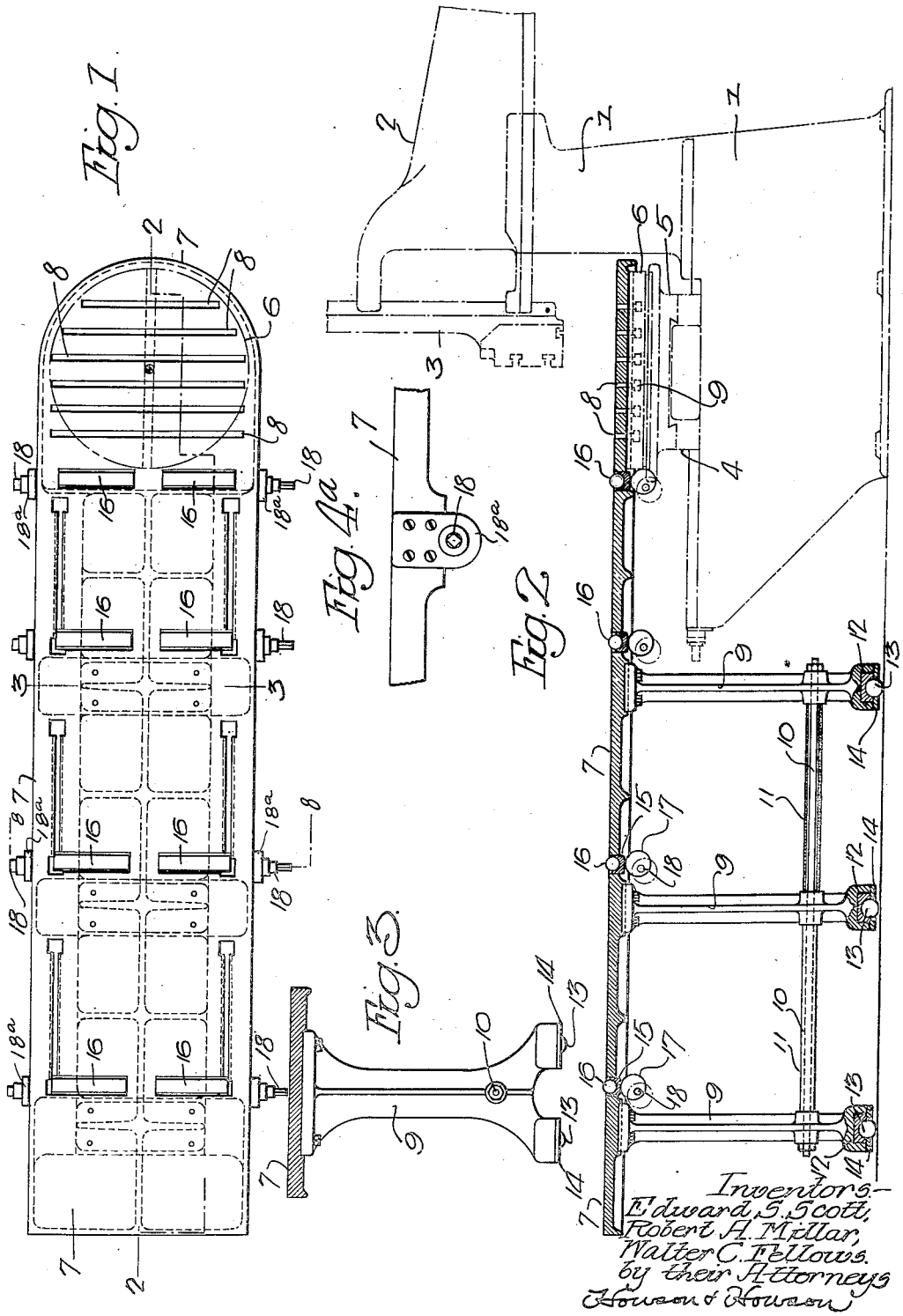

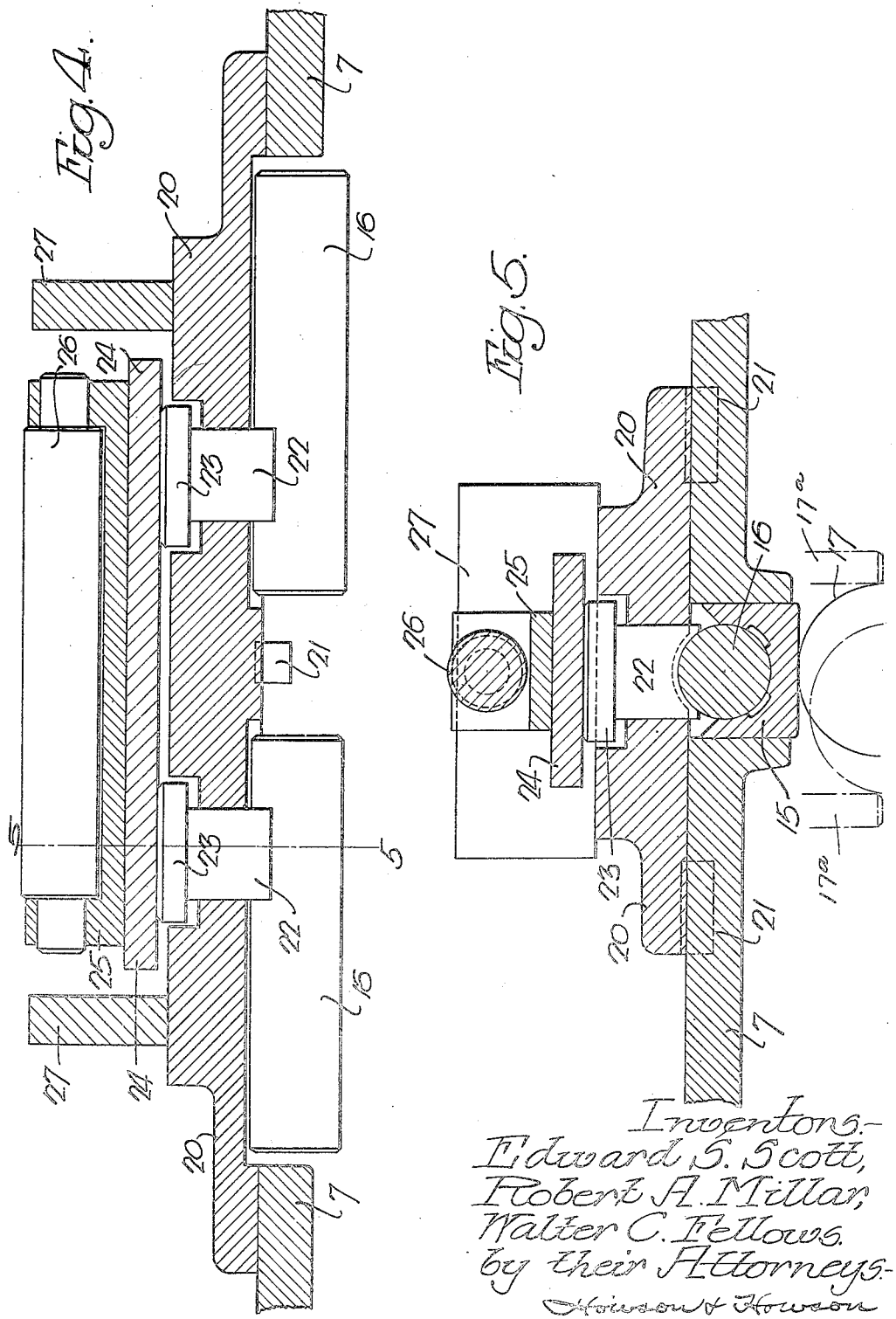

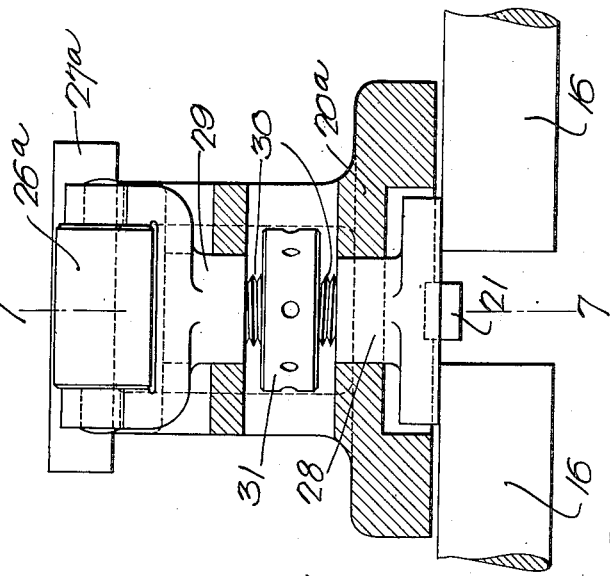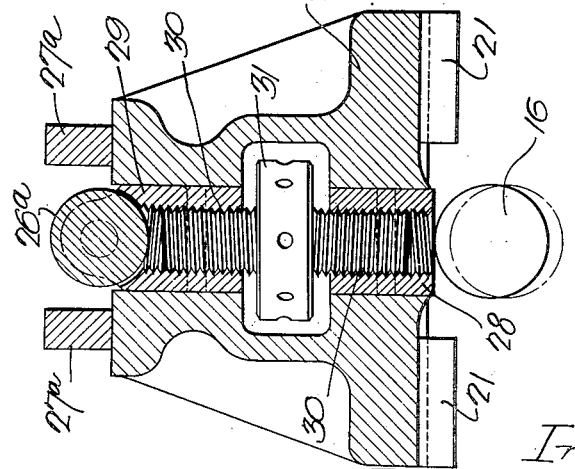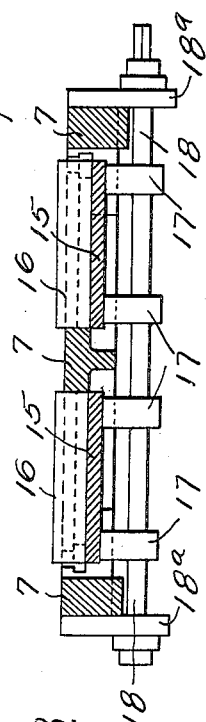

1,511,141

UNITED STATES PATENT OFFICE.

EDWARD S. SCOTT, OF CAMDEN, NEW JERSEY, AND ROBERT A. MILLAR AND WALTER C. FELLOWS, OF PHILADELPHIA, PENNSYLVANIA, ASSIGNORS TO MATILDA J. DILL, OF PHILADELPHIA, PENNSYLVANIA.

EXTENSION TABLE FOR MACHINE TOOLS.

Application filed May 27, 1922. Serial No. 564,119.

*To all whom it may concern:*

Be it known that we, EDWARD S. SCOTT, ROBERT A. MILLAR, and WALTER C. FELLOWS, citizens of the United States, said SCOTT residing in Camden, New Jersey, and said MILLAR and FELLOWS residing in Philadelphia, Pennsylvania, have invented an Extension Table for Machine Tools, of which the following is a specification.

One object of our invention is to provide a convenient, simple and substantial work-supporting table particularly adapted for use in connection with machine tools such as slotters, drill presses or the like, where it is frequently desired to mount and adjust relatively long objects in a horizontal plane so that they may be conveniently and accurately operated on.

It is further desired to provide a novel form of extension table for use with or attached to the rotary table of a machine tool in such manner that it may swing with the same and thereby so support a relatively long structure or mass of material that it may be readily operated on by a tool such as the cutter of a slotter or drill press.

The invention also contemplates novel means for vertically adjusting the position of a more or less elongated structure upon a work table so that when it is to be operated on by a tool, it shall be directly carried by or rest upon the flat top of the table, and when it is to be moved on said table, it shall be carried by anti-friction elements such as rollers, in order than such movement may be easily accomplished.

We also desire to provide an attachment for a work table equipped with vertically movable work-supporting rollers, which shall include relatively simple, easily applied, convenient and substantial means whereby an article carried may be easily transferred at will to the supporting elements of an auxiliary carrier or to the anti-friction elements thereof; the arrangement contemplating also novel auxiliary elevating mechanism for adjusting the position of an article or structure operated on.

These objects and other advantageous ends we attain as hereinafter set forth, reference being had to the accompanying drawings, in which, Fig. 1 is a plan illustrating a work-supporting table constructed in accordance with our invention;

Fig. 2 is a longitudinal vertical section on the line 2—2, Fig. 1;

Fig. 3 is a transverse vertical section on the line 3—3, Fig. 1;

Fig. 4 is a transverse vertical section on an enlarged scale, showing the auxiliary work-supporting device as applied to one pair of the elevating rollers;

Fig. 4$^a$ is a fragmentary elevation of a portion of the table top;

Fig. 5 is a transverse section on the line 5—5, Fig. 4;

Fig. 6 is a transverse section similar to Fig. 4, showing a modified form of one feature of our invention;

Fig. 7 is a vertical section on the line 7—7, Fig. 6; and

Fig. 8 is a sectional view on the line 8—8, Fig. 1.

In Figs. 1 to 3 of the above drawings, 1 represents the main frame of a machine tool such as a slotter, having a horizontally reciprocable head 2 and carrying a vertically reciprocable tool-supporting ram 3. Mounted on the main portion 1 of the frame is a carriage 4 movable toward and from the head 2 and having guided upon it a transversely movable carriage 5 which serves to support a rotary work table 6.

In accordance with our invention we provide means for adjustably supporting a horizontally elongated structure or body of material on the rotary table 6 and for this purpose provide a flat top extension table 7, one end of which is clamped to the top face of the rotary table 6 and has its extremity semi-circularly curved concentric with the axis of rotation thereof.

Any suitable means may be provided for rigidly clamping the extension table to the rotary table and in the present instance we have formed it with a series of transversely extending slots 8 designed to receive clamping bolts whose heads extend into T slots 9 in the rotary table 6. The extension table projects radially away from the rotary table 6 and its outer portions are carried upon any suitable number of columns or standards 9—9, preferably having their lower portions rigidly connected together and braced by a tie rod 10 extending through them parallel with the long axis of the extension table and mounted within tubular spacing elements 11.

Each of the columns or standards 9 is formed with feet having cavities in their lower faces for the reception of bearing boxes 12 in each of which is mounted a steel ball 13 held in place by a retaining plate 14 so that it constitutes an anti-friction element between the foot and the relatively smooth floor or platform on which the structure rests.

At any suitable points in the extension table 7 are formed more or less elongated transversely extending openings for the reception of bearing boxes 15, each carrying a roller 16 and each in turn carried upon a roller or equivalent structure 17 eccentrically mounted on short spindles 18 journaled in bearings 18ª carried by the extension table 7. In the present instance, the rollers 16 are arranged in aligned pairs both of whose bearing boxes rest upon a single controlling eccentric element which may be adjusted by a suitable crank handle applied to the squared end of its spindle 18, see Fig. 8.

The various parts are so proportioned that when the eccentric elements 17 of any pair are in one position, their coacting anti-friction rollers 16 lie wholly below the plane of the surface of the top of the table 7, but when said elements are rotated, the bearing boxes 15 are caused to slide upwardly in the guideways provided by the openings in the table, thereby moving the cylindrical surfaces of the rollers 16 above the table top. With this construction it is obvious that any elongated object deposited upon the table may be so raised that it is supported solely by the rollers 16 of the several pairs, whereupon it may easily be moved longitudinally as well as laterally in order to bring any desired part of it into a predetermined position relatively to the cutting tool of the machine of which the table 6 forms a part. After having been so brought to the adjusted position, the eccentric elements may be successively rotated to lower the rollers 16 so that the object or structure previously carried by them will rest directly upon the flat table top, to which it may be clamped or otherwise rigidly connected to permit it to be operated on by the cutting tool. Posts 17ª projecting down from the under side of the table top on opposite sides of the elements 17, serve to limit the angle through which these may turn and thus hold the roller carrying boxes in their extreme positions. Obviously at any time the rollers may again be raised by turning the spindles 18 so that the work may be supported by them and conveniently moved as desired.

In case it should be desirable or necessary to support and adjust a structure or piece of work at a level considerably above that of the table top, we provide the attachments shown in Figs. 4 and 5 which consist of auxiliary tables 20 having flat under faces designed to rest upon the flat top of the main table 7 and be positioned thereon against lateral movement by keys 21 fitting suitable slots therein. Each of the auxiliary tables, of which there may be two or more, is provided with a pair of vertically slidable blocks 22 having cylindrically concaved under faces designed to fit the curved surfaces of one pair of the rollers 16 and having flat topped heads 23 designed to support a flat plate 24 on which is carried a bearing box 25 supporting a roller 26. Mounted on each auxiliary table 20 is a pair of more or less elongated blocks 27 either loose or fixedly mounted and extending parallel with each other at the opposite ends of the rollers 26.

The arrangement and proportioning of the parts is such that when the elevating rollers 16 are in their lower positions, the plate 24 rests upon the top of the auxiliary table 20 and the roller 26 is so far lowered that a structure having a plane bottom face would extend between and be supported by the blocks 27. In this position it could be clamped to the main table or to the auxiliary table as desired to permit of its proper manipulation by the machine tool with which the tables are associated, and when it is desired to move the structure, the rotation of the eccentric support 17 will not only raise the roller 16 but through the blocks 22, plate 24 and blocks 25 will also raise the roller 26 to such a height as to cause it to raise the structure or work off of the blocks 27.

If each pair of the rollers 16 be equipped with one of the auxiliary tables shown in Figs. 4 and 5, then as before the structure may be so raised as to be supported wholly upon rollers, which permits of its easy and convenient placing, removal and adjustment and permits it to be positioned upon immovable structures such as the table 7 or blocks 27 after its adjustment has been completed.

If a greater range of vertical movement be required than is provided by the eccentric supports 17, we provide the attachments shown in Figs. 6 and 7, each of which consists of a bracket or fixture 20ª designed to rest upon and be keyed to the main table top 7. In this case however there is mounted in said bracket a head 28 whose lower face is designed to rest upon one or both of a pair of the rollers 16 and which is guided to slide vertically in said bracket.

Also similarly guided in the bracket is a yoke 29 in whose branches is journaled a roller 26ª and both the yoke 29 and the head 28 are threaded to receive a screw 30. The latter has a central flange or collar 31 formed with radial openings for the reception of a bar or rod whereby it may be turned and the bracket 20ª is formed with flat top surfaces designed to support a pair of blocks 27ª on opposite sides of the roller 26ª.

In this case as before, rotation of the eccentric 17 vertically raises the pair of rollers 16 associated therewith and through the head 28, screw 30 and yoke 29, raises the roller 26ª above the plane of the tops of the blocks 27ª. If now for any reason it be desired to still further raise said roller with any structure which may be resting thereon, this may be conveniently accomplished by turning the collar or flange 31 whereupon, owing to the fact that the screw 30 is formed with threads on both ends, said roller 26ª may be raised to any desired height within the range permitted by the length of said screw. Obviously this adjustment may be accomplished independently of the rollers 16 or it may be employed in addition thereto.

In any case however, it will be appreciated from the above description that we have provided relatively simple and convenient means whereby a structure on a work table may be conveniently transferred to a set of rollers so that it may easily be moved or it may at will be lowered upon the table top or upon stationary elements mounted thereon, preparatory to being clamped in place and operated on by a machine tool.

Moreover the invention is particularly adapted to support in a substantially horizontal position, relatively long castings requiring machine tool operations and that in such manner as to permit these being swung in a horizontal plane around the center of rotation of the rotary work table of the machine tool. It is consequently a relative easy and convenient matter to adjust and operate on such relatively long objects which it has hitherto been difficult to accurately and immovably support while they were being acted on by such machines as slotters, drill presses, or the like.

We claim:

1. The combination of a machine tool having a rotary work table; an extension table arranged to be secured to the rotary work table of the machine tool; and means for supporting the free end of the extension table so that it can be turned with the rotary work table of the machine.

2. The combination of a machine tool having a rotary work table; an extension table having a portion extending over the work table and forming the support for the work; means for securing the extension table to the work table; and means for supporting the outer end of the extension table so that it is free to move with the rotary work table of the machine.

3. The combination with the rotary table of a machine tool of an elongated extension table having one end fixed to and movable with the rotary table and extending radially away from the same in a horizontal plane; with at least one leg supporting the outer end of said extension table and including a foot having an anti-friction floor-engaging element.

4. A work supporting table for a machine tool having a substantially flat top formed with openings therein; rollers mounted in the openings; bearings for the rollers; and eccentrically mounted rotary elements on which the bearings rest so that, when the rotary elements are turned, the rollers are moved vertically.

5. The combination with a work supporting table having a plurality of sets of aligned rollers vertically movable above the plane of the table top; eccentrically mounted rotary members respectively operative upon the rollers of each set for moving them vertically; means for turning said rotary members at will; and stops for limiting the angle through which the members may be turned.

6. The combination of a work table having an opening therein; a bearing box vertically slidable in said opening; a roller carried by said bearing box; and a rotary eccentric element supporting the bearing box and adjustable to cause the roller thereof to be projected above or withdrawn below the plane of the table top at will.

7. The combination of a work table having an opening therein; a roller mounted in said opening; means for vertically moving the roller to project it above or withdraw it below the table top; and an auxiliary table including a second roller vertically movable by means of the first roller.

8. The combination of a work table having an opening therein; a roller vertically movable in said opening; means for raising said roller at will; with an auxiliary roller removably associated with said first roller and operative up and down therewith.

9. The combination of a work table having an opening therein; a roller vertically movable in said opening; means for vertically moving said roller at will; an auxiliary table mounted on said work table; a member slidably mounted in said auxiliary table and vertically movable by said roller; with a second roller movable vertically by said member.

10. The combination of a work supporting table; rollers mounted thereon and movable vertically; an auxiliary table; members mounted in said auxiliary table and resting upon said rollers respectively; an auxiliary roller; and means carried by said members for supporting the latter roller.

11. The combination of a work table; rollers thereon; an auxiliary table mounted on the work table; supporting blocks on the auxiliary table; rollers on the auxiliary table; and means for vertically adjusting said rollers to lower a structure on, or to raise it above the blocks at will.

12. The combination of a work table; an auxiliary table mounted thereon; supporting blocks on said auxiliary table; a roller; means for vertically moving said roller to lower a structure on or raise it above said box at will, said means comprising a main actuating member and a rotary eccentric element for vertically moving said member.

13. The combination of a work table; an auxiliary table thereon; work supporting members for the auxiliary table; a roller; and two operatively independent devices for vertically moving said roller relatively to the work supporting elements.

14. The combination of a work table; an auxiliary table mounted thereon; a vertically movable structure guided in said auxiliary table; a roller carried by said structure; and means for vertically adjusting said structure at will.

15. The combination of a work table; an auxiliary table mounted thereon; a vertically movable structure guided in said auxiliary table; a roller carried by said structure; means for vertically adjusting said structure at will, said structure including relatively adjustable elements and means for relatively moving said elements.

16. The combination of a work table; an auxiliary table mounted thereon; two elements vertically guided in said auxiliary table; a screw adjustably threaded into said elements; and a roller carried by one of the elements.

17. The combination of a work table; an auxiliary table mounted thereon; two elements vertically guided in said auxiliary table; a screw adjustably threaded into said elements; a roller carried by one of the elements; with means for simultaneously moving both of said elements independently of the screw.

EDWARD S. SCOTT.
ROBERT A. MILLAR.
WALTER C. FELLOWS.